United States Patent
Liu et al.

(10) Patent No.: US 6,852,954 B1
(45) Date of Patent: Feb. 8, 2005

(54) BUILT-IN ELECTRIC HEATING STRUCTURE FOR A TRAVEL MUG OR THERMOS BOTTLE

(75) Inventors: Chih-Hsiang Liu, Chang Hua (TW); Shu-Fen Li, Chang Hua (TW)

(73) Assignee: J Sheng Co., Ltd., Chang Hua (TW)

( * ) Notice: Subject to any disclaimer, the term of this patent is extended or adjusted under 35 U.S.C. 154(b) by 0 days.

(21) Appl. No.: 10/326,312

(22) Filed: Dec. 23, 2002

(51) Int. Cl.⁷ .............................. A47J 36/26; H05B 1/02
(52) U.S. Cl. ........................ 219/436; 219/387; 219/435
(58) Field of Search ................................ 219/387, 429, 219/435, 436, 438, 441; 439/135, 136, 528

(56) References Cited

U.S. PATENT DOCUMENTS

| | | | | |
|---|---|---|---|---|
| 1,978,089 A | * | 10/1934 | Jones | 219/432 |
| 2,046,125 A | * | 6/1936 | Lacy | 219/436 |
| 2,863,037 A | * | 12/1958 | Johnstone | 219/432 |
| 3,231,716 A | * | 1/1966 | Van Den Bosch | 219/433 |
| 3,931,494 A | * | 1/1976 | Fisher et al. | 219/441 |
| 5,571,023 A | * | 11/1996 | Anthony | 439/142 |
| 6,013,901 A | * | 1/2000 | Lavoie | 219/435 |
| 6,072,161 A | * | 6/2000 | Stein | 219/432 |
| 6,140,614 A | * | 10/2000 | Padamsee | 219/438 |
| 6,303,909 B1 | * | 10/2001 | Fernando et al. | 219/429 |
| 2002/0040900 A1 | * | 4/2002 | Arx et al. | 219/544 |
| 2002/0175158 A1 | * | 11/2002 | Sanoner et al. | 219/387 |

* cited by examiner

*Primary Examiner*—Joseph Pelham
(74) *Attorney, Agent, or Firm*—Harrison & Egbert

(57) ABSTRACT

A travel mug has an outer case, an inner case, a film heater, a temperature control device, and a power source connector. The inner case is fitted into the outer case in conjunction with a spacer, thereby resulting in formation of an air space insulation between the inner case and the outer case. The film heater is fastened to the bottom end of the inner case and is connected to an electrical receptacle of the outer case by a wire which is also connected with the temperature control device located in proximity of the film heater. The receptacle is connected to a power source by the power source connector.

6 Claims, 9 Drawing Sheets

BUILT-IN ELECTRIC HEATING STRUCTURE FOR A TRAVEL MUG OR THERMOS BOTTLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a travel mug or thermos bottle, and more particularly to a built-in electric heating structure of the travel mug or thermos bottle.

BACKGROUND OF THE INVENTION

As shown in FIGS. 8 and 9, a travel mug of the prior art comprises an inner case 70, an outer case 71, a thermal insulation material 72, and a heating coil 74. The inner case 70 is made of a plastic material and is fitted into the outer case 71 along with the thermal insulation material 72 which is located between the inner case 70 and the outer case 71. The inner case 70 is provided at the bottom end with an aluminum foil cover 73 which is encircled by the heating coil 74. The heating coil 74 is connected to a power source cord 76 via a through hole 75 of the outer case 71.

Such a prior art travel mug as described above is defective in design in that the assembly of the travel mug is done along with the aluminium foil cover 73 and the thermal insulation material 72, thereby resulting in an increase in production cost. In addition, the heating efficiency is poor due to the limited contact between the aluminum foil cover 73 and the heating coil 74.

The inner case 70 is vulnerable to damage caused by heat in the event that it is inadvertently kept empty while being heated. Moreover, the power source cord 76 is inseparably attached to the outer case 71 and is therefore bothersome during packing.

BRIEF SUMMARY OF THE INVENTION

The primary objective of the present invention is to provide a travel mug with a built-in heating structure which is free of the deficiencies of the prior art structure described above. The built-in heating structure of the present invention is also applicable to a thermos bottle.

In keeping with the principle of the present invention, the foregoing objective of the present invention is attained by a travel mug or thermos bottle, which comprises an outer case, an inner case, a spacer, a pliable film heater, and a temperature control device. The inner case is made of a material which is an excellent conductor of heat. The inner case is fitted into the outer case in conjunction with the spacer such that an air space is formed between the inner case and the outer case, with the air space acting as insulation to help retain heat. The periphery of the bottom end of the inner case is encircled by the pliable film heater along with the temperature control device which automatically controls the film heater in such a way that it sets off the film heater at a certain temperature, and that it prevents the overheating of the film heater. The outer case is provided with a receptacle to receive the plug of a power source cord, which can be thus separated from the travel mug of the present invention while not in use.

The features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
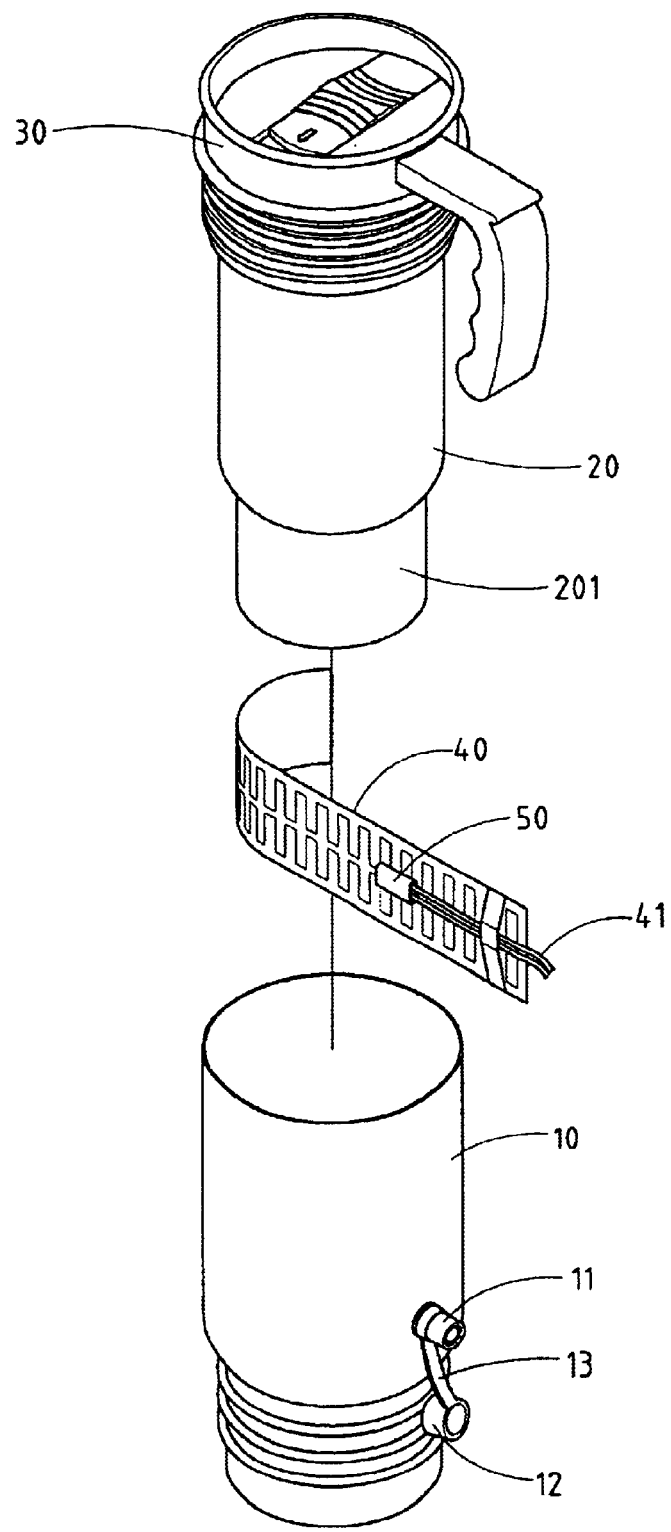
FIG. 1 shows an exploded perspective view of the preferred embodiment of the present invention.
Figure 2:
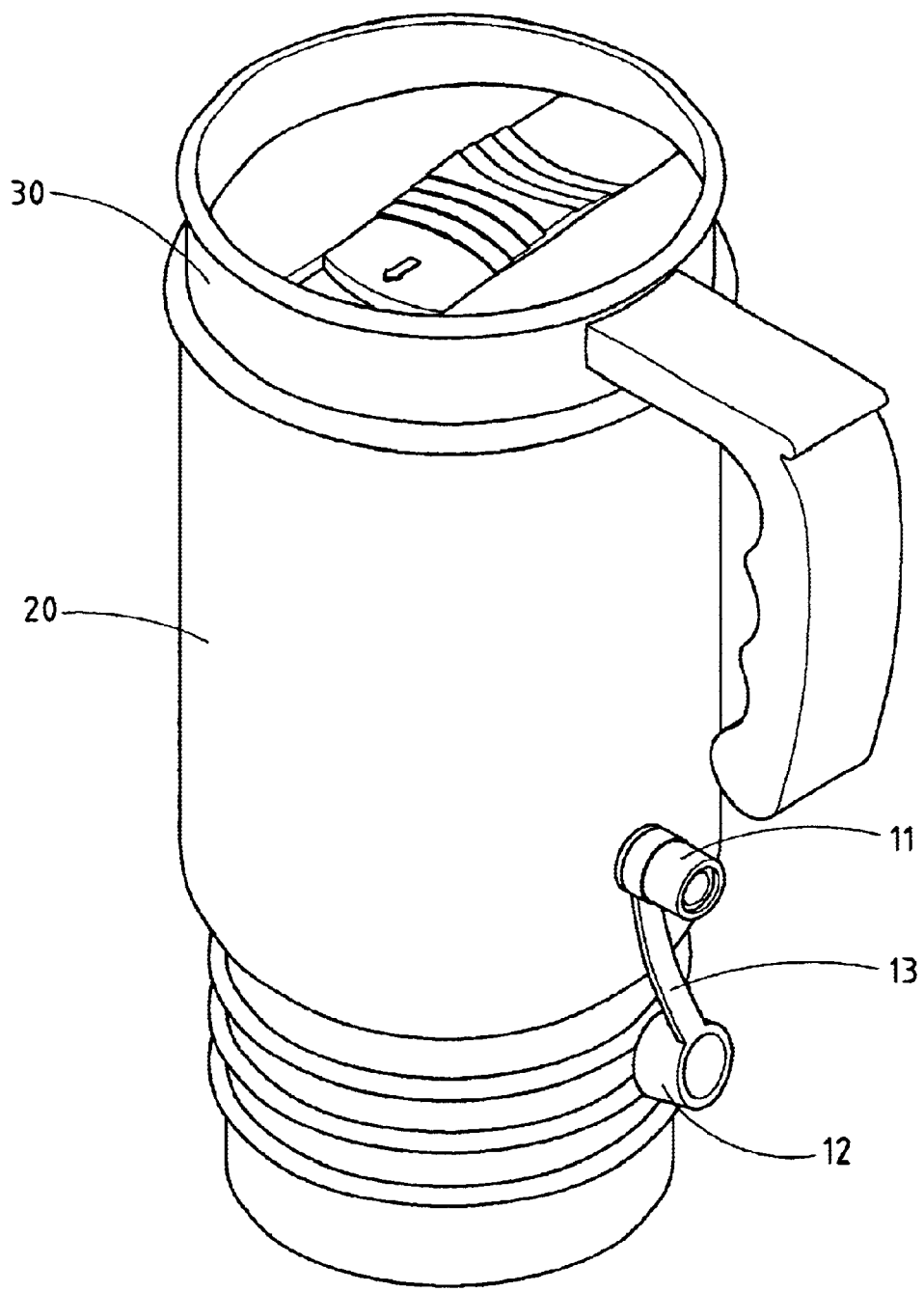
FIG. 2 shows a perspective view of the preferred embodiment of the present invention.

As shown in FIGS. 1–6, a travel mug embodied in the present invention comprises an outer case 10, an inner case 20, a spacer 30, a pliable film heater 40, a temperature control device 50, and a power source connector 60.

The outer case 10 is provided with a receptacle 11, a protective cover 12 removably fitted over the receptacle 11, and a soft strap 13 which is fastened at one end with the outer case 10 and at the other end with the protective cover 12.

Figure 3:
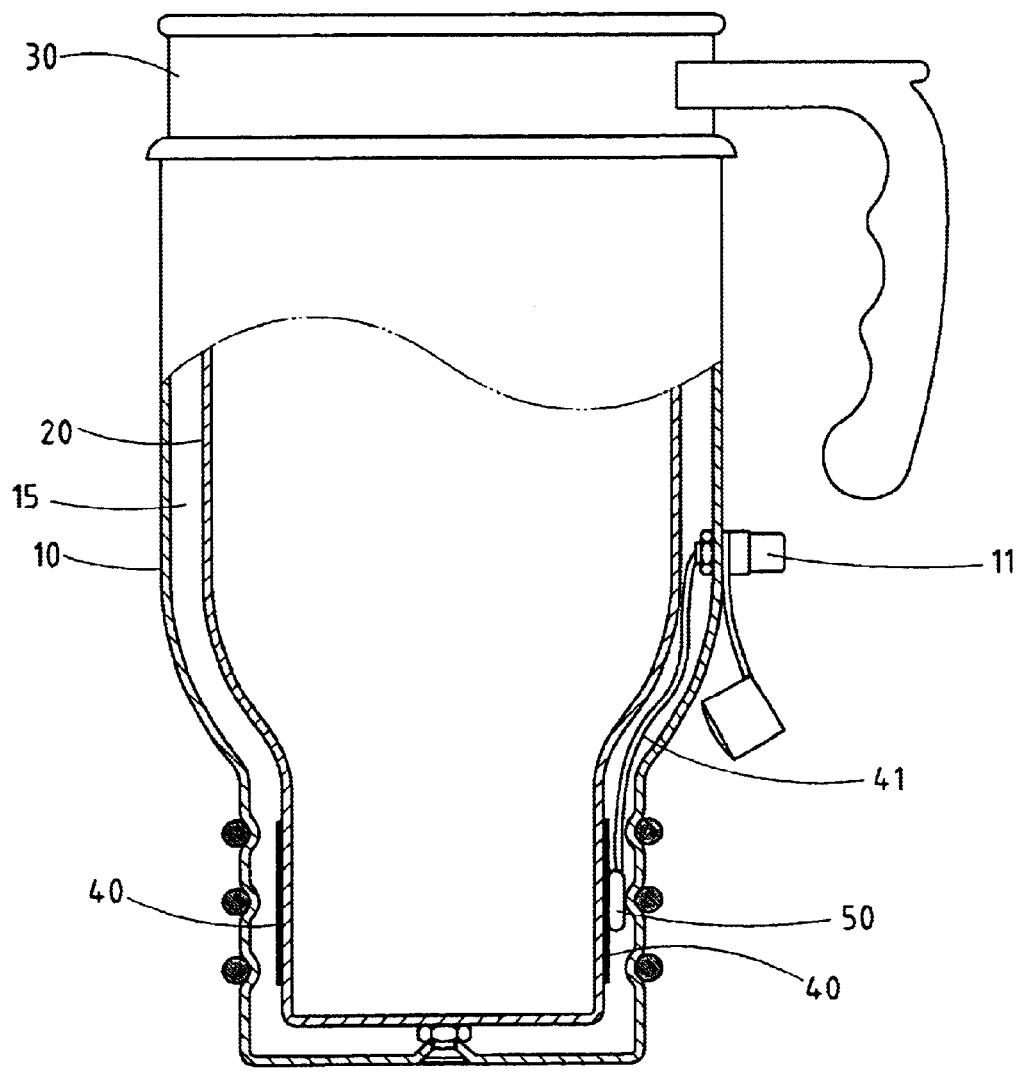
FIG. 3 shows a longitudinal sectional view of the preferred embodiment of the present invention as shown in FIG. 2.

The inner case 20 is made of a heat-conductible material and is fitted into the outer case 10 in conjunction with the spacer 30 of a plastic material, which is disposed between the top end of the inner case 20 and the top end of the outer case 10, thereby resulting in formation of an air space 15 for insulation to help retain heat, as shown in FIG. 3. The inner case 20 of the present invention may be made of a metal material, or plastic material capable of withstanding high temperatures.

The pliable film heater 40 is intimately attached to the outer surface of a bottom end portion 201 of the inner case 20 and is connected to the receptacle 11 of the outer case 10 by a wire 41.

The temperature control device 50 is located in proximity of the film heater 40 and is connected with the wire 41. The temperature control device 50 is used to regulate automatically the power supply to the film heater 40 such that the power supply is interrupted at the time when the temperature of the inner case 20 has reached a predetermined level, and that the power supply is resumed at a certain temperature.

Figure 4:
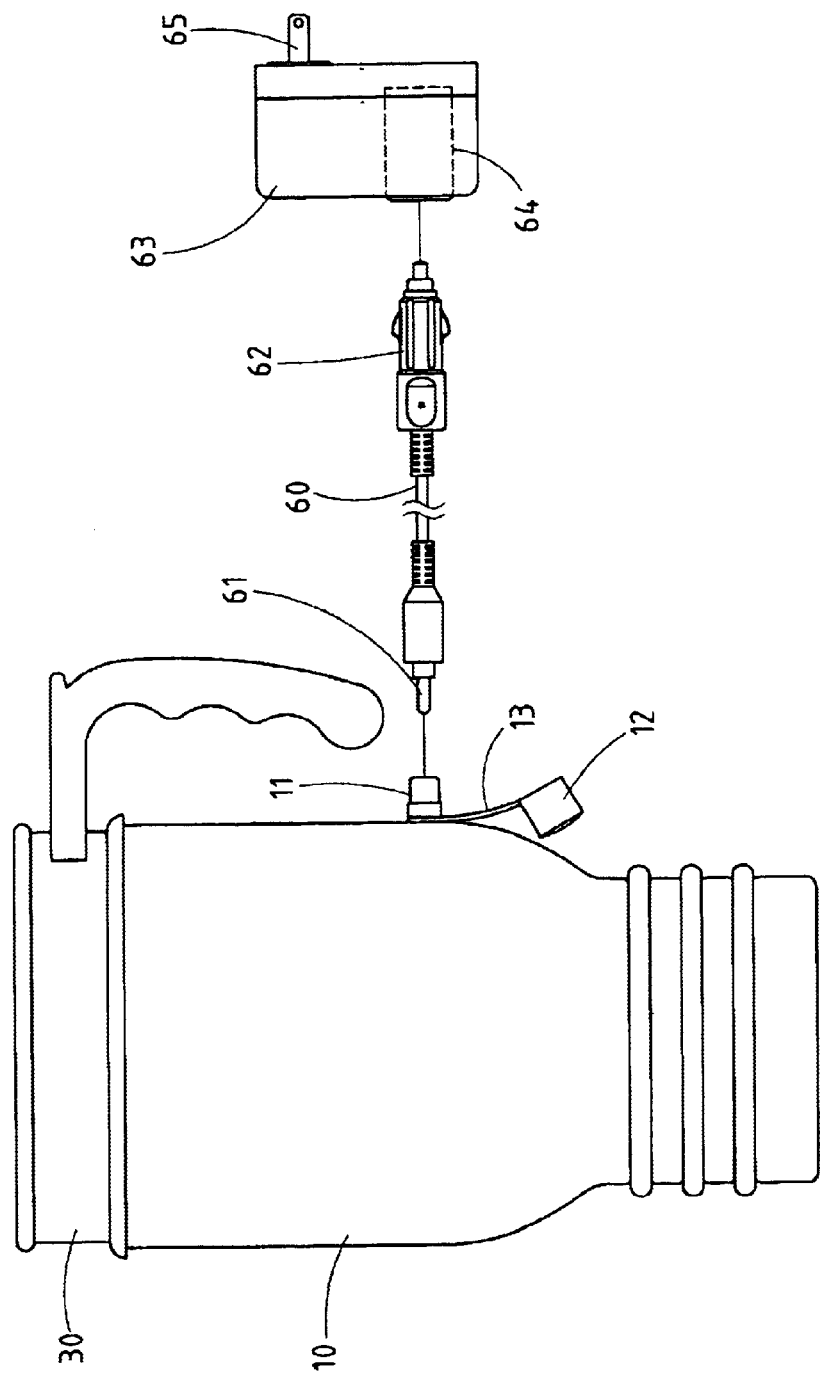
FIG. 4 shows a perspective view of the preferred embodiment of the present invention along with a power source connector applicable to the electrical circuit of a motor vehicle.

The power source connector 60 is provided at one end with a plug 61, which is fitted into the receptacle 11 of the outer case 10, and at the other end with a connection head 62 which can be connected to the electrical circuit of a motor vehicle or fitted into a receiving slot 64 of an adaptor 63. The adaptor 63 is provided with a plurality of prongs 65 which can be fitted into an outlet of alternating current, as shown in FIG. 4.

Figure 5:
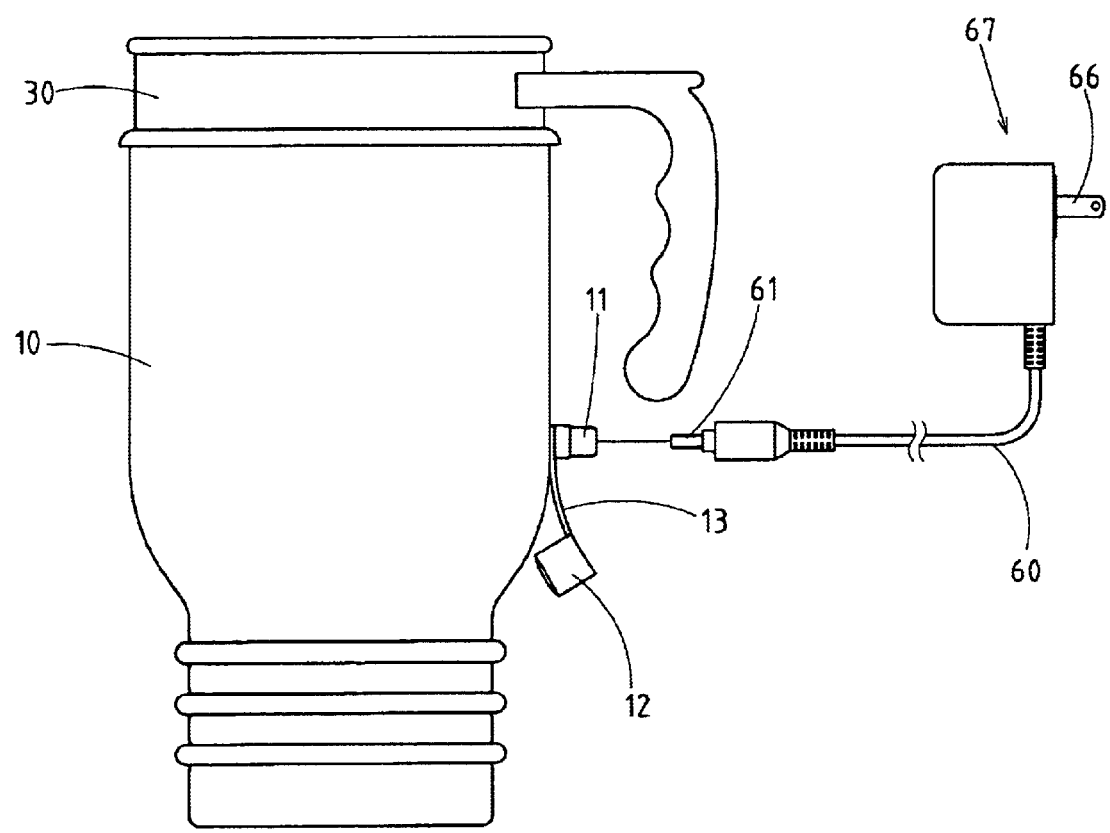
FIG. 5 shows a perspective view of the preferred embodiment of the present invention along with a power source connector applicable to the household electrical circuit.

As shown in FIG. 5, the connector 60 of the present invention is provided with an adaptor 67 having a plurality of prongs 66, which can be fitted into a household outlet.

Figure 6:
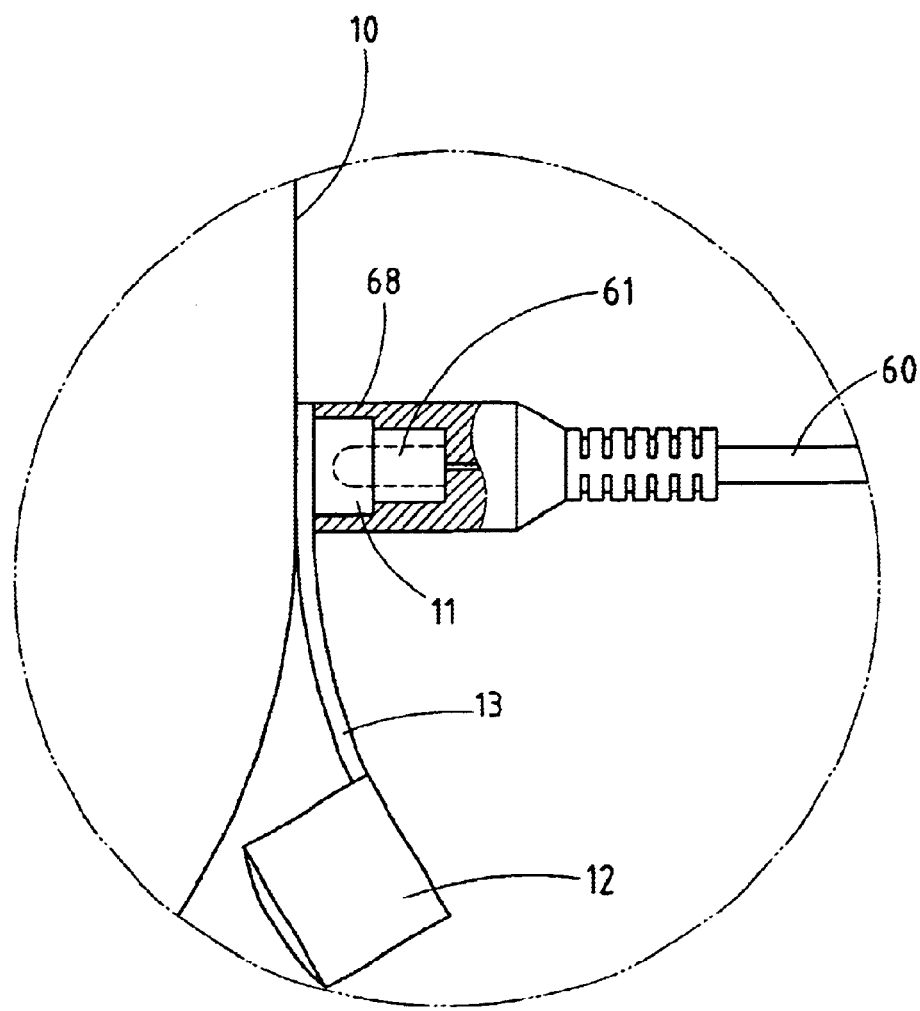
FIG. 6 shows a schematic view of a protective shield of the power source connector that shields the receptacle of the outer case of the present invention.

As shown in FIG. 6, the plug 61 of the power source connector 60 is provided with a protective shield 681 which is removably fitted over the receptacle 11 of the outer case 10 at the time when the plug 61 is fitted into the receptacle 11. In light of the receptacle 11 being made of a metal material, the protective shield 68 serves to present the direct contact of the fingers with the receptacle 11.

Figure 7:
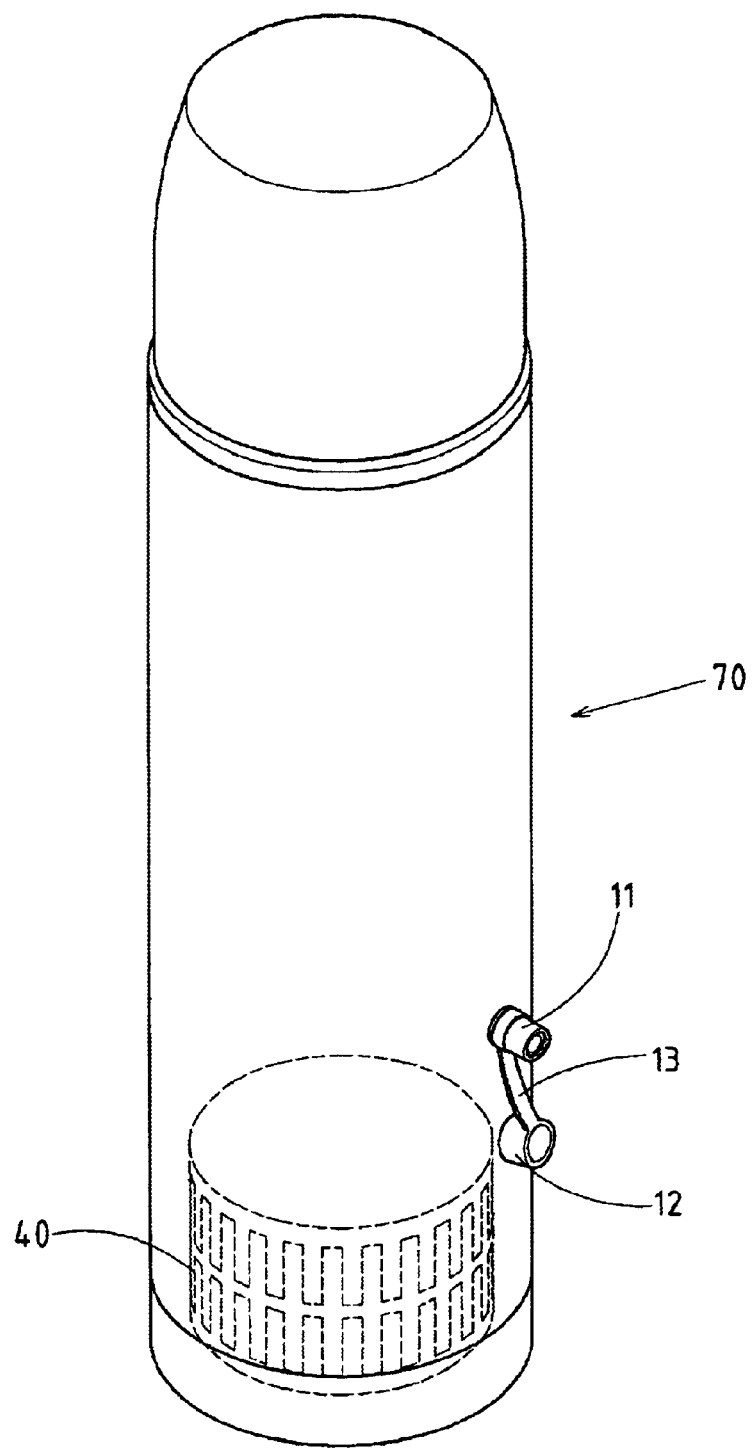
FIG. 7 shows a perspective view of a thermos bottle of the present invention.
Figure 8:
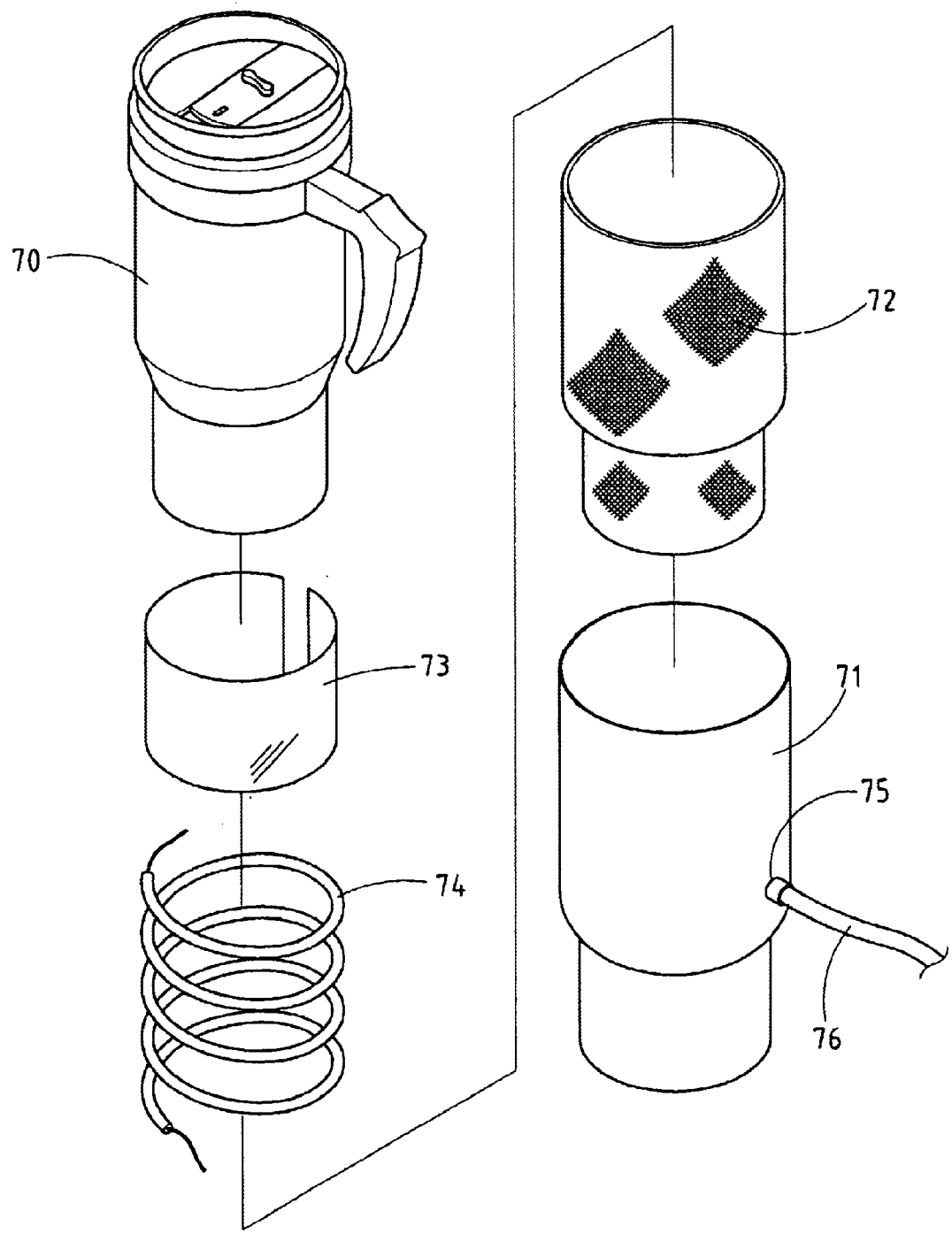
FIG. 8 shows an exploded view of a travel mug of the prior art.
Figure 9:
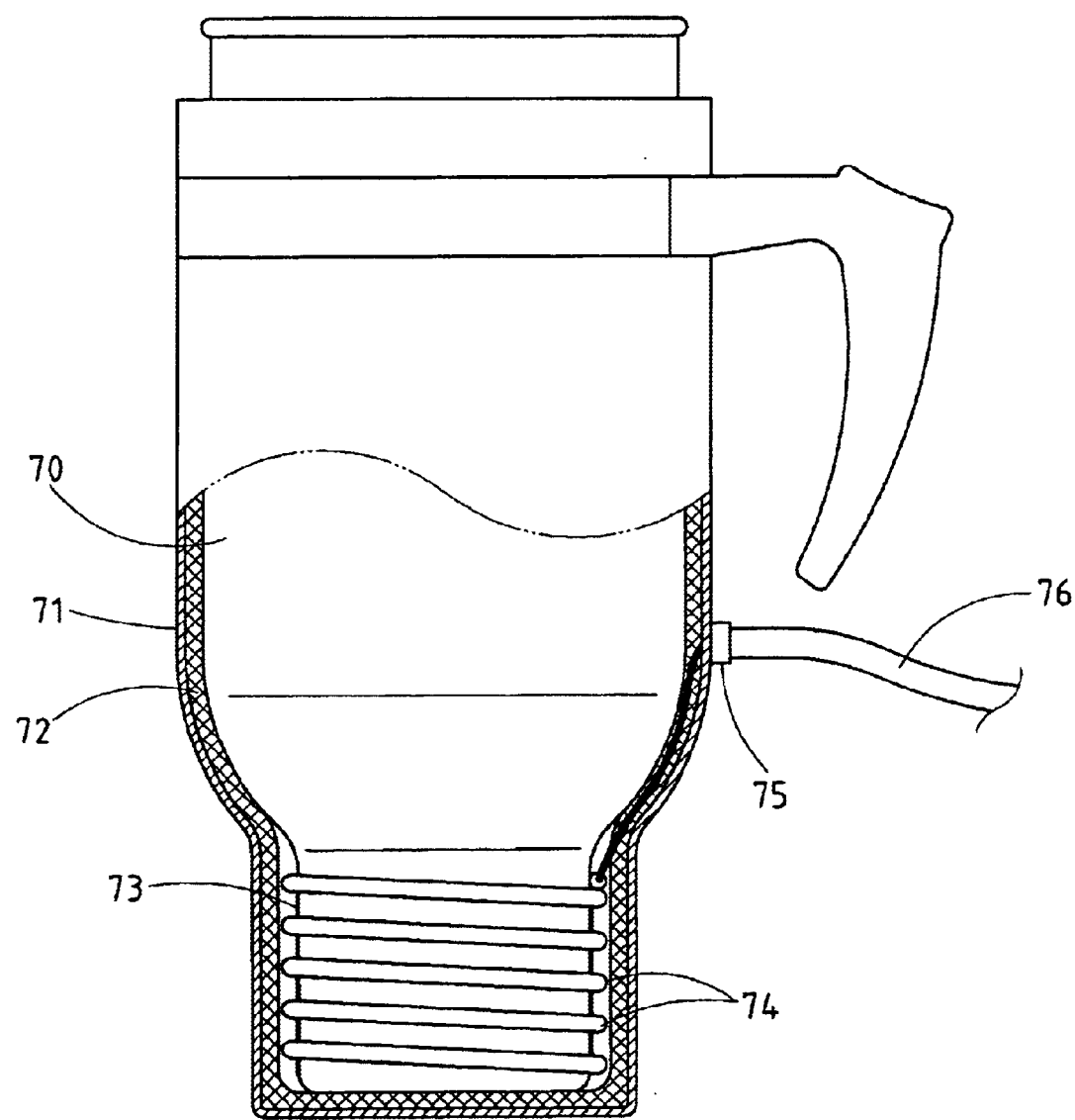
FIG. 9 shows a longitudinal sectional view of the prior art travel mug.

The built-in electrical heating structure of the present invention is applicable to a thermos bottle 70, as shown in FIG. 7.

The assembly of the present invention is relatively cost-effective. For example, the present invention is provided with the air space 15 which is located between the inner case 20 and the outer case 10 for insulation to help retain heat. The air space 15 serves to replace the thermal insulation material. In addition, the present invention comprises the temperature control device 50 to ensure the safety of the present invention. Furthermore, the present invention is relatively versatile by virtue of the fact that the present invention is adaptable in an automotive vehicle, office, or private home.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claims.

We claim:

1. A travel mug comprising:

an outer case having an electrical receptacle affixed thereto;

an inner case formed of a heat-conductible material, said inner case fitted into said outer case, said inner case having an upper portion extending outwardly of a top end of said outer case, said upper portion having a diameter less than a diameter of said outer case, said inner case affixed to said outer case by a threaded connection at a bottom thereof;

a spear disposed between a top end of said inner case and said top end of said outer case so as to define an air space between an inner wall of said outer case and an outer wall of said inner case, said air space having no insulation material therein;

a handle affixed to said upper portion of said inner case and extending outwardly therefrom so as to be in spaced relation to an outer wall of said outer case;

a pliable film heater attached to an outer surface of a bottom end portion of said inner case and connected to said receptacle of said outer case by a wire;

a temperature control device located in proximity to said film heater and connected to said wire; and a power source connector means for connecting said electrical receptacle to a power source, said power source connector means comprising a plug having a protective shield, said plug being fitted into said electrical receptacle of said outer case such that said protective shield is removably fitted over said electrical receptacle.

2. The travel mug of claim 1, wherein said electrical receptacle of said outer case has a protective cover whereby said protective cover is removably fitted over said electrical receptacle and is fastened to one end of a strap, said strap being fastened at another end to said outer case.

3. The travel mug of claim 1, wherein said inner case is formed of a metal material.

4. The travel mug of claim 1, wherein said inner case is formed of a plastic material.

5. The travel mug of claim 1, said power source connector means for connecting to an electrical circuit of a motor vehicle outlet.

6. The travel mug of claim 1, said power source connector means for connecting to an electrical circuit of an office or household outlet.

* * * * *